United States Patent [19]

Kast

[11] 3,934,612
[45] Jan. 27, 1976

[54] FLUID VALVE WITH WIDE TEMPERATURE RANGE

[75] Inventor: Howard Berdolt Kast, Fairfield, Ohio

[73] Assignee: The United States of America as represented by the United States National Aeronautics and Space Administration, Washington, D.C.

[22] Filed: July 8, 1974

[21] Appl. No.: 486,471

[52] U.S. Cl....... 137/625.3; 137/625.31; 251/335 B; 251/77; 251/368
[51] Int. Cl.² ......................................... F16K 47/06
[58] Field of Search....... 137/625.3, 625.31, 329.01; 251/77, 335 B, 368, 357, 208

[56] References Cited
UNITED STATES PATENTS

| | | | |
|---|---|---|---|
| 1,315,741 | 9/1919 | Pranold | 137/625.3 X |
| 3,331,396 | 7/1967 | Willis | 137/625.31 |
| 3,480,037 | 11/1969 | Alexander, Jr. | 251/208 X |
| 3,683,965 | 8/1972 | McClure et al. | 137/625.3 |
| 3,831,621 | 8/1974 | Anthony et al. | 137/625.31 X |

*Primary Examiner*—Arnold Rosenthal
*Attorney, Agent, or Firm*—James W. Johnson, Jr.; Derek P. Lawrence

[57] ABSTRACT

A fluid valve suitable for either metering or pressure regulating fluids at various temperatures is provided for a fuel system as may be utilized in an aircraft gas turbine engine. The valve includes a ceramic or carbon pad which cooperates with a window in a valve plate to provide a variable area orifice which remains operational during large and sometimes rapid variations in temperature incurred from the use of different fuels.

9 Claims, 3 Drawing Figures

FLUID VALVE WITH WIDE TEMPERATURE RANGE

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

In general, this invention relates to a fluid valve with wide temperature range and, more particularly, to a fluid valve with wide temperature range of a type particularly suited for metering or pressure regulating fuel in an aircraft gas turbine engine fuel system wherein the fuel may be either liquid or gaseous and may vary rapidly from a cryogenic temperature to a high temperature.

During the current energy crisis many drastic measures have been suggested to conserve our precious fuel reserves. One of these measures involves the curtailment of scheduled airline flights in order to save petroleum which can otherwise be refined into home heating oil or gasoline. It has been recently suggested that other fuels such as liquified natural gas (methane) and liquid hydrogen might be used interchangeably to power aircraft gas turbine engines, particularly those of the supersonic variety. Such a change in aircraft fuels would have the immediate effect of making available large quantities of petroleum for other purposes. In addition, a liquid hydrogen fuel system may have broader application such as to recoverable space vehicle, for use in a space shuttle program.

Before liquified natural gas and liquid hydrogen can be used as fuel for an aircraft gas turbine engine, suitable fuel systems will have to be developed which can function properly under severe temperature differentials. Such temperature differentials may vary as much as from −400°F to + 1,050°F or higher and will impose severe expansion problems on vital fuel system components such as metering and pressure regulating valves, where variable area orifices must remain operable in all temperature ranges. Severe changes in the sizes of conventional metering valve components due to variations in temperature may cause binding or seizing of the valve components thus being unacceptable for safe engine operation.

Therefore, it is a primary object of this invention to provide either a metering or pressure regulating valve suitable for use in a temperature variable fuel system in a gas turbine engine.

It is a further object of this invention to provide a metering valve wherein the variable metering orifices remain operable despite rapid temperature variations in the regulated fluid of from −400°F to + 1,050°F.

It is also an object of this invention to provide a metering valve or pressurizing valve wherein the regulated fluid may be natural gas or hydrogen in either the liquid or gaseous state.

Summary of the Invention

These and other objects and advantages will be more clearly understood from the following detailed description and drawings, all of which are intended to be representative of, rather than in any way limiting on, the scope of invention. A temperature insensitive valve has a housing with an inlet and outlet therefrom together with a valve plate having at least one window therethrough for receipt of a flow of fluid from the valve inlet. A rotating member is provided in spaced relation with the valve plate and has at least one ceramic or carbon pad in sliding engagement with the face of the valve plate such that at least one edge of the pad cooperates with a respective window to form a variable area orifice. A bellows coupling connects a rotatable shaft extending from the housing to the rotating member such that rotation of the shaft operates to rotate the rotating member through the bellows coupling which remains substantially rigid in shear while accommodating limited axial motion of the shaft relative to the rotating member.

BRIEF DESCRIPTION OF THE DRAWINGS

The invention may be better understood upon reading the following description of the preferred embodiment in conjunction with the accompanying drawings.

DESCRIPTION OF THE PREFERRED EMBODIMENT

Figure 1:
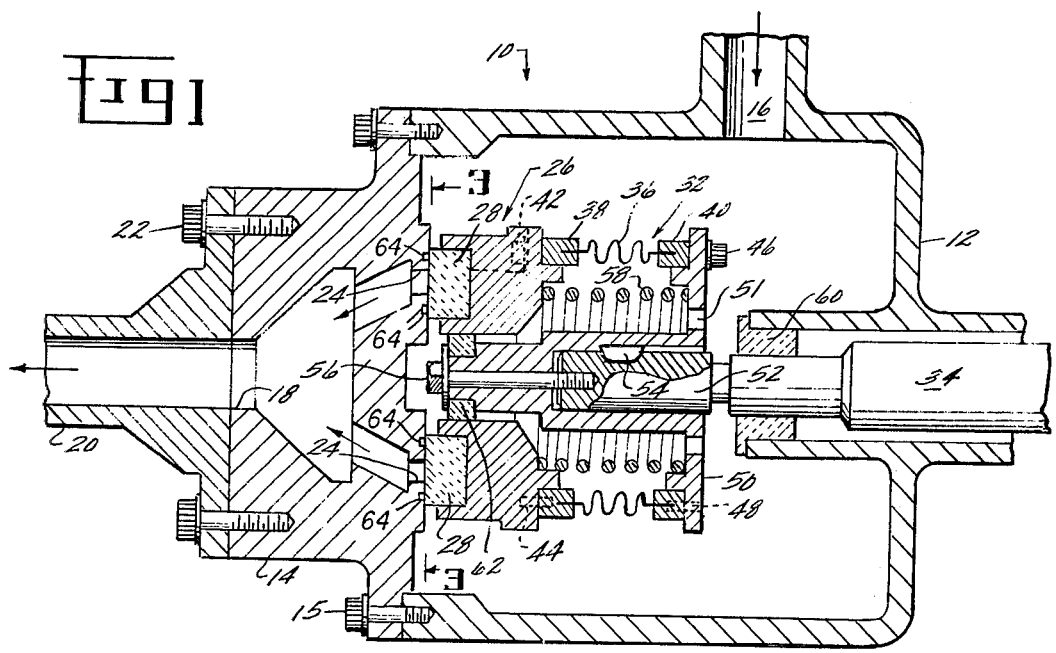
FIG. 1 shows a cross-sectional view of the temperature insensitive fluid valve of this invention.

Referring to FIG. 1, there is shown at 10 a fluid valve with wide temperature range of a type particularly suited for use in an aircraft gas turbine engine fuel system wherein the fuel may be natural gas (methane) or hydrogen in either the liquid or solid state. The valve 10 may be either the metering or pressure regulating type and includes a housing 12 open at one end with a valve plate 14 affixed to the open end thereof by a plurality of spaced apart bolts 15. The housing 12 includes an inlet port 16 for receiving an inlet flow of fuel whereupon the fuel exits from the valve housing through an outlet port 18. An outlet conduit 20 is affixed to the valve plate 14 by a second plurality of spaced apart bolts 22.

Figure 3:
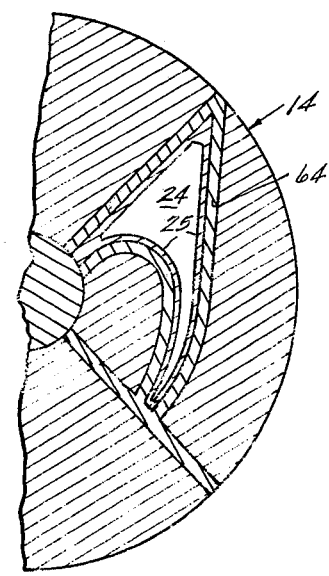
FIG. 3 shows a cross-sectional view taken across the lines 3—3 of FIG. 1.

The valve plate 14 includes two spaced apart outlet windows or ports 24 wherein the transition from a fairly substantial restriction to a negligible restriction may be made in a progressive fashion as indicated by edge portions 25 shown in FIG. 3. The configuration and number of ports 24 is not limited to those shown but may be in any shape and number as fulfills the requirements of a particular fuel system. As will be readily understood, the valve 10 shown in the drawings may also be any well known bypass valve which is adapted to maintain a constant pressure differential between two points in a fuel flow system.

Figure 2:
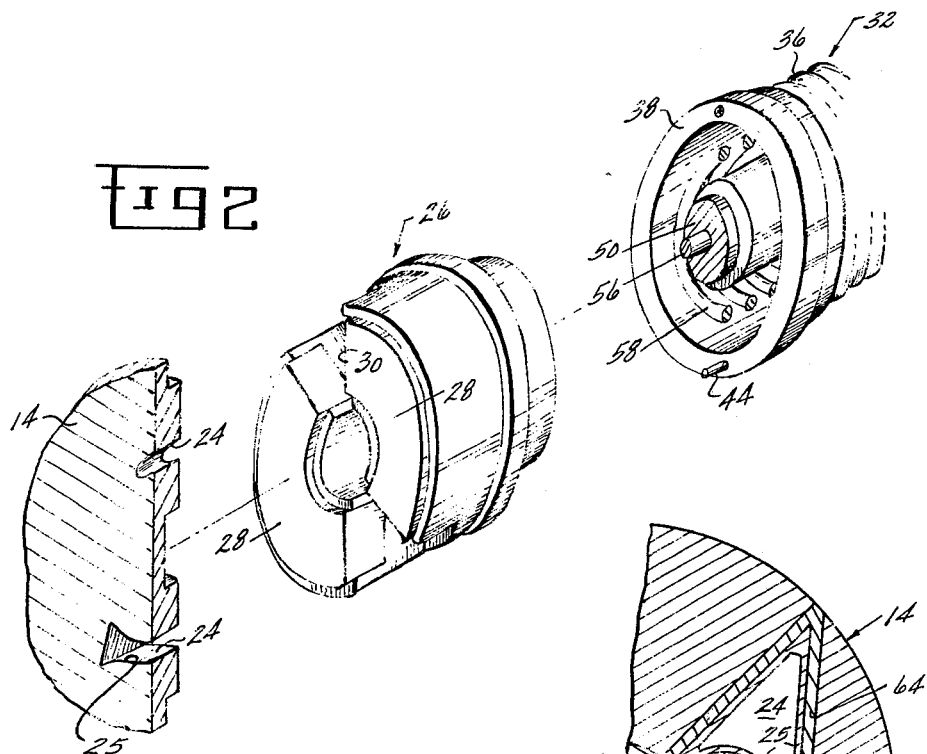
FIG. 2 shows an exploded perspective view of some of the components of the valve of FIG. 1.

A rotating member 26 is provided in coaxially spaced apart alignment with the valve plate 14 and includes two spaced apart pads 28 of generally wedge shape fixedly secured to the face thereof in sliding engagement with the face of the valve plate. The pads 28 have generally radial edges 30 as shown in FIG. 2 which cooperate with the windows 24 to form variable flow area orifices within the valve 10. It can be seen that the effective flow area of the variable orifices formed by the cooperation between the above elements may be varied as the rotating member 26 is urged into rotation about its center axis.

A shaft 34 is coupled to the rotating member 26 through a bellows coupling 32 which includes a bellows 36 of relatively large diameter to provide a high torsional spring rate. The bellows 36 is coupled at opposing ends thereof by ring members 38 and 40 wherein ring member 38 is fixedly connected to the rotating member 26 by circumferentially spaced apart bolts 42 and pin 44. In like manner, the ring member 40 is secured to an annular adapter 50 by circumferentially spaced apart bolts 46 and pin 48 wherein an inner bore of the adapter is fixedly connected by a locking bolt 56 to a taper 52 at the end of the shaft 34. Should the locking bolt 56, for some reason, loosen, there is also provided a key 54 for circumferentially locking the taper 52 to the adapter 50. The pads 28 are urged into tight seating engagement with the face of the valve plate 14 by a compression spring 58 disposed between the rotating member 26 and the adapter 50 and by the pressure drop.

The shaft 34 is disposed for rotation relative to the housing 12 by a journal bearing 60 which may be of a conventional carbon type. A tight clearance is maintained between the bearing 60 and the shaft 34 in order to provide a seal which will reduce fuel circulation along the shaft 34. The adapter 50 is also disposed for rotation relative to the rotating member 26 by a radial bearing 62 which may also be of the carbon type. It will be further understood that the bearing 62 has generally large clearances. The adapter 50 includes a plurality of spaced apart holes 51 which permit fuel to enter and fill the annular cavity defined between the bellows coupling 32 and the adapter 50.

During operation, the shaft 34 may be driven by a conventional rotary actuator (not shown) wherein the rotary actuator is mechanically biased through a conventional servo valve (also not shown) which receives an electrical signal indicative of various operating parameters such as speed, temperature and pressure. During normal engine operation, the servo valve may receive an electrical signal indicating that the position of a metering valve should be changed for that particular running condition. When a change in speed, temperature or pressure is sensed, such as to require a change in the valve 10, the control system transmits a mechanical bias to the actuator so as to rotate the shaft 34. The rotation of the shaft 34 will operate through the bellows coupling 32 to rotate the rotating member 26 so as to change the metering areas of the variable orifices as defined by the cooperation of the windows 24 with the edges 30 of the pads 28. The bellows coupling 32 is rigid in shear so as to accurately position the rotating member 26 in accordance with shaft 34 rotation. As will be readily appreciated, the bellows coupling 32 will allow axial motion of the shaft 34 relative to the rotating member 26 as may be expected to occur due to temperature differentials existing between the various components of the valve 10.

The fluid valve 10 of this invention herein described is especially designed to pass both methane and hydrogen fuels which impose extreme temperature requirements in view of the fact that both fuels have a temperature range of from −400°F to + 1,050°F or higher. Under such an extreme temperature differential, it becomes difficult to maintain operation of the metering orifices in conventional valves. Such a wide temperature range together with rapidly changing fuel temperatures can cause many difficulties in conventional valves. For example, if a conventional spool valve were used during rapid temperature transients, then the sleeve around the spool would likely cool more rapidly than the spool causing the spool to bind within the sleeve. However, the fluid valve of this invention avoids such difficulties because the rotating member is not confined axially. Another problem which may arise with conventional valves at high temperatures relates to the sliding metal parts seizing due to improper bearing characteristics. However, the carbon or ceramic pads of this invention could not seize or "weld" to the valve plate during operation at high temperatures. In addition, it has been found advantageous to provide the surface of the valve plate 14 contacting the pads 28 with a substantially wear resistant surface of stainless steel which is "nitrided". The valve plate 14 may also include a vented groove 64, as best shown in FIG. 3, around the window 24 so as to reduce the area across which the pressure drop is sensed.

Accordingly, while the preferred embodiment in a preferred application of the present invention has been depicted and described, it will be appreciated by those skilled in the art that many modifications, substitutions and changes may be made thereto without departing from the invention's fundamental theme. For example, the valve 10 would not be limited solely to application in a gas turbine engine methane-hydrogen fuel system, but may be widely used in other fluid systems, particularly those incurring extreme temperature differentials.

Thus having described a preferred embodiment of the invention, though not exhaustive of all possible equivalents, what is desired to be secured by Letters Patent is claimed below.

What is claimed is:

1. A valve comprising:
   a housing having an inlet and outlet therefrom,
   a valve plate having at least one window therethrough for receipt of a flow of fluid from the valve inlet,
   a rotating member in spaced relation with the valve plate having at least one ceramic pad in sliding engagement with the face of the valve plate such that at least one edge of the ceramic pad cooperates with a respective window to form a variable area orifice,
   means for moving the rotating member relative to the valve plate, and
   wherein the moving means includes a bellows coupling, one end of which connects to the rotating member and the other end of which connects to a rotatable shaft extending from the valve housing.

2. The valve of claim 1, wherein the bellows coupling includes:
   a bellows coupled at opposing ends by ring members one of which connects to the rotating member,
   an annular adapter connecting to the other ring member and including an inner bore fixedly connected to a taper at the end of the shaft, and
   a compression spring disposed between the rotating member and adapter so as to urge the pad into tight seating engagement with the face of the valve plate such that rotation of the shaft operates to rotate the adapter in turn rotating the rotating member through the bellows which remains substantially rigid in shear while accommodating limited axial motion of the shaft relative to the rotating member.

3. A valve comprising:
   a housing having an inlet and outlet therefrom,
   a valve plate having at least one window therethrough for receipt of a flow of fluid from the valve inlet, a rotating member in spaced relation with the valve plate having at least one ceramic pad in sliding engagement with the face of the valve plate such that at least one edge of the ceramic pad cooperates with a respective window to form a variable area orifice, means for moving the rotating member relative to the valve plate, and wherein the valve is of the metering type having two circumferentially spaced apart windows in the valve plate thereof together with two circumferentially spaced apart pads of generally wedge shape attached to the rotating member which is maintained in coaxially spaced apart alignment with the valve plate.

4. A valve comprising:

a housing having an inlet and outlet therefrom, a valve plate having at least one window therethrough for receipt of an inlet flow of fluid from the valve housing, a rotating member in spaced relation with the valve plate having at least one carbon pad in sliding engagement with the face of the valve plate such that at least one edge of the carbon pad cooperates with a respective window to form a variable orifice, means for moving the rotating member relative to the valve plate, and wherein the moving means includes a bellows coupling, one end of which connects to the rotating member and the other end of which connects to a rotatable shaft extending from the valve housing.

5. The valve of claim 4, wherein the bellows coupling includes:

a bellows coupled at opposing ends by ring members one of which connects to the rotating member, an annular adapter connecting to the other ring member and including an inner bore fixedly connected to a taper at the end of the shaft, and a compression spring disposed between the rotating member and adapter so as to urge the pad into tight seating engagement with the face of the valve plate such that rotation of the shaft operates to rotate the adapter in turn rotating the rotating member through the bellows which remains substantially rigid in shear while accommodating limited axial motion of the shaft relative to the rotating member.

6. A valve comprising:

a housing having an inlet and outlet therefrom, a valve having at least one window therethrough for receipt of an inlet flow of fluid from the valve housing, a rotating member in spaced relation with the valve plate having at least one carbon pad in sliding engagement with the face of the valve plate such that at least one edge of the carbon pad cooperates with a respective window to form a variable orifice, means for moving the rotating member relative to the valve plate, and wherein the valve is of the metering type having two circumferentially spaced apart windows in the valve plate thereof together with two circumferentially spaced apart pads of generally wedge shape attached to the rotating member which is maintained in coaxially spaced apart alignment with the valve plate.

7. A valve comprising:

a housing having an inlet and outlet therefrom, a valve plate having at least one window therethrough for receipt of a flow of fluid from the valve inlet, a rotating member in spaced relation with the valve plate having at least one pad in sliding engagement with the face of the valve plate such that at least one edge of the pad cooperates with a respective window to form a variable orifice, a rotatable shaft extending from the housing, and a bellows coupling connecting the rotatable shaft to the rotating member such that rotation of the shaft operates to rotate the rotating member through the bellows coupling which remains substantially rigid in shear while accommodating limited axial motion of the shaft relative to the rotating member.

8. The valve of claim 7, wherein the bellows coupling includes:

a bellows coupled at opposing ends by ring members, one of which connects to the rotating member, an annular adapter connecting to the other ring member and including an inner bore fixedly connected to a taper at the end of the shaft, and a compression spring disposed between the rotating member and adapter so as to urge the pad into tight seating engagement with the face of the valve plate.

9. The valve of claim 8, wherein the shaft is disposed for rotation relative to the housing by a carbon journal bearing having a tight clearance maintained between the bearing and shaft in order to provide a seal which will reduce fuel circulation along the shaft, and the adapter is disposed for rotation relative to the rotating member by a radial bearing which may also be of the carbon type having large clearances wherein fluid enters and fills the annular cavity defined between the bellows coupling and adapter through a plurality of holes in the adapter.

* * * * *

UNITED STATES PATENT OFFICE
CERTIFICATE OF CORRECTION

PATENT NO. : 3,934,612
DATED : January 27, 1976
INVENTOR(S) : Howard Berdolt Kast It is certified that error appears in the above-identified patent and that said Letters Patent are hereby corrected as shown below:

Column 5, line 50, after the word "valve" insert - plate -.

Signed and Sealed this

Twentieth Day of July 1976

[SEAL]

Attest:

RUTH C. MASON
*Attesting Officer*

C. MARSHALL DANN
*Commissioner of Patents and Trademarks*